Figure 1:
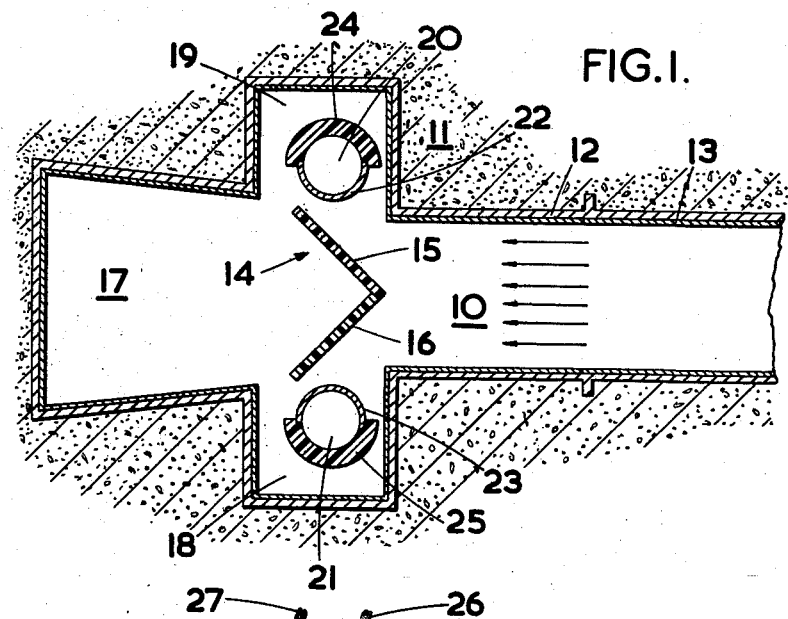

March 24, 1964    A. C. WHITTIER    3,126,481
THERMAL NEUTRON MEASURING DEVICE FOR MEASURING REACTOR POWER
Filed April 15, 1960

Inventor:
Angus Charles Whittier
By Kenon, Palmer & Stewart

3,126,481
THERMAL NEUTRON MEASURING DEVICE FOR MEASURING REACTOR POWER
Angus Charles Whittier, Peterborough, Ontario, Canada, assignor to Atomic Energy of Canada Limited, Ottawa, Ontario, Canada, a corporation
Filed Apr. 15, 1960, Ser. No. 22,626
3 Claims. (Cl. 250—83.1)

The present invention relates to apparatus for measuring the thermal neutron flux of a nuclear reactor.

The thermal power density of a nuclear reactor is approximately proportional to the thermal neutron flux in the reactor. A change in thermal neutron flux generally means a change in power. It is of extreme importance that an operator know at what power level the reactor is operating and, if this level is changing, how fast it is changing.

A small percentage of the thermal neutrons leak out of the reactor core and are lost to the reaction. The number leaking out is approximately proportional to the neutron flux and hence the power in the core. Therefore, a neutron detector such as a boron coated or filled (in the form of $BF_3$) ionization chamber or any other neutron detector placed so as to detect the escaping neutrons will be capable of indicating approximately the pile power and the rate of change of power.

When fissions take place in a reactor, fast neutrons, fission fragments, and gamma rays are liberated from the fissioning nucleus.

Most of the fast neutrons make collisions with the moderator nuclei and are slowed down to become thermal neutrons. Some of the fast neutrons leak out of the reactor before being thermalized. Some of the fast neutrons which arrive in the vicinity of the thermal neutron detector may be thermalized by moderating material nearby and, if they then are scattered into the detector, will give a contribution to the signal output of the detector. Fast neutrons can arise from another source. When a gamma ray of sufficient energy encounters a nucleus, sometimes a neutron is emitted from the nucleus. This is called a photoneutron. The number of photoneutrons born per second, i.e. the photoneutron source strength, is insignificant, during operation, compared to the fission neutron source strength.

Thermal neutron detectors are also sensitive to gamma radiation, and the gamma radiation from a nuclear reactor is intense. Therefore, a thermal neutron detector placed near a reactor so as to measure the neutron level, will have, in addition to the "neutron signal" a "gamma ray signal," the two signals being indistinguishable and appearing as one signal. The gamma rays come from several reactions, mainly:

(a) When fission takes place in a nucleus some gamma rays are released.
(b) The heavy fragments, i.e. "fission products," are usually radioactive and emit gamma rays for an extended period after they are formed.
(c) When a neutron is captured in a nucleus, a gamma ray is emitted even when capture takes place in non-fissile nuclei.
(d) The nucleus resulting from neutron capture mentioned in (c) is often radioactive and emits gammas long after the neutron capture took place.

Another source of gamma radiation is from the structure surrounding the detector. Take as an example a detector around which is a concrete shield. Some of the thermal neutrons which pass in the vicinity of the detector could, instead of being captured in it to contribute to the signal, be captured in the concrete. Some materials, when they capture neutrons, become radioactive, and emit gamma rays. Cobalt, which is present in concrete in a small degree, is an example of such a material. Neutrons captured in cobalt form radioactive cobalt which emits gamma rays of approximately 1.2 mev., with a half life of 5.3 years. This activation by thermal neutrons from the reactor can easily be dealt with by covering all concrete surfaces near the detector with a thermal neutron absorber which does not become appreciably activated, such as cadmium, or the material sold under the trade name "Boral." However, fast neutrons cannot be so easily disposed of. Fast neutrons striking the shield near the detector may be thermalized in the shield and then captured. There are no known materials which would serve as a thin coating to stop fast neutron penetration of the shield as was the case of cadmium for thermal neutrons. The gamma rays arising from neutron capture and subsequent decay of radioactive material will give a further contribution to the detector output.

Thus, during operation a power monitor for a nuclear reactor will give a signal due to:

(a) Thermal neutrons from the pile
(b) Fast neutrons from the pile
   (i) From fission
   (ii) From photo emission
(c) Gamma rays from the pile
   (i) Prompt fission gammas
   (ii) Decay of fission products
   (iii) Neutron capture gammas
   (iv) Decay of activated material
(d) Gamma rays from a radioactive shield.

Thermal neutrons from the pile, fast neutrons from the pile, and gamma rays from the pile will be proportional to pilepower, and gamma rays from a radioactive shield which are insignificant compared to the others during operation will be a function of the length of operation of the installation.

The power of a reactor is reduced, i.e. the reactor is "shut down," by reducing the neutron flux in the reactor. This is accomplished usually by inserting absorbing material (control rods) into the pile, or by reducing the pile size by lowering the moderator level. When this is done the neutron flux will drop several powers of ten. If the moderator is dropped so that fuel elements and coolant are exposed there will be a relatively high photoneutron flux impinging on the detector and surroundings. These neutrons, when thermalized by moderating material in the vicinity of the detector, may give a signal several times that due to thermal neutrons coming from the pile. The following radiations will decrease very rapidly: thermal neutrons from the pile, fast neutrons from fission, prompt fission gammas, neutron capture gammas; and the remainder, which arise from photo emission, decay of fission products, decay of activated material, and gamma rays from a radioactive shield will not decrease nearly so fast. In fact, under certain circumstances the signal from the slowly decreasing group will completely swamp the signal from the rapidly decreasing group. Under these conditions, it might be possible for the pile to reach criticality, the power to increase rapidly, yet the increase not be detected immediately due to the signal from the slowly decreasing group. It is conceivable that a power runaway would not be detected until too late, and the reactor damaged or human life endangered.

What is required therefore is a detector installation which will be sensitive to thermal neutrons, and relatively insensitive to gamma rays and fast neutrons. This has been done to some extent in the NRU reactor at Chalk River by the following method. Neutrons escaping the reactor are collimated into a beam by means of a 6" diameter hole through the $D_2O$ and $H_2O$ reflectors, the steel thermal shield, and the concrete biological shield.

About 9' away from the reactor end of the hole a lead block about 6" in diameter, and 8" long is placed. Around the hole at this point is a cavity in which are placed neutron detector backed by neutron reflecting material. Between the hole and the detectors is a 2" thickness of lead shielding. Thermal neutrons from the pile traverse the beam hole, scatter off the lead block, and some are captured by the detectors to produce a signal indicating pile power. The neutron reflector, which is made of polythene, will enhance the signal somewhat. Gamma rays will also be scattered by the lead block. The 2" lead shielding is necessary to reduce this gamma scatter to an acceptable level. Fast neutrons will be scattered into the detector and polythene reflector with the same efficiency as are thermal neutrons.

There are three main objections to the NRU installation. Firstly it scatters all radiations equally well, secondly, it requires a lot of lead which is heavy and costly, and thirdly, thermal neutrons must pass through a lot of lead before getting to the detector. Some of the thermal neutrons will be absorbed by the lead and hence that part of the signal due to thermal neutrons will be significantly reduced by this absorption.

The present invention overcomes the disadvantages of known thermal neutron flux detectors by providing apparatus for measuring the thermal neutron flux of a nuclear reactor which comprises means forming a path for radiation from the active lattice of said nuclear reactor to a thermal neutron detector, which path includes a thin hydrogenous scattering substance adapted to scatter thermal neutrons being detected by the detector. The thermal neutron detector is positioned in relation to the scatterer to receive thermal neutrons scattered by the scatterer and substantially no other radiations. Such a structure may advantageously be incorporated in a nuclear reactor as follows: a collimated beam of pile radiations is formed and streams down a beam hole. In the path of the beam a thin hydrogenous scatterer is placed. This scatterer may be formed of two pieces of ½" thick polystyrene shaped in a V at 90° to each other. Some of the radiation is scattered into the thermal neutron detectors. Most of the gamma rays and fast neutrons will not be scattered by the scatterer but will pass right through it to be caught some distance away in a "beam catcher". The beam catcher is shaped so that a minimum of back scattered radiation will strike the detectors. Nearly all of the thermal neutrons will be scattered by the scatterer, some of which will enter the detectors to contribute to the signal.

The essential feature of the scatterer is that it have a high hydrogen content. Pure hydrogen would be ideal but obviously, this is impractical. The reason for hydrogen being the best material is that it:

(a) Has the highest cross-section of any element, for scattering thermal neutrons.
(b) Has the lowest cross-section of all the elements for scattering gamma rays.

The next best thing to pure hydrogen is a rigid, radiation resistant substance with a high hydrogen content. Other elements in the scattering material should have as low a gamma cross-section as possible; since the gamma cross-section is simply proportional to the atomic number of the atom, the other elements should have low atomic numbers. Carbon is the first element that can be combined with hydrogen in a practical way for use in a scatterer. Therefore, hydrocarbons are the best substances for the scatterer from the point of view of the requirement that it have a high ratio of thermal neutron to gamma scattering cross-section. Polythene is a good material. Polystyrene is also good. While polythene has twice the hydrogen to carbon ratio as does polystyrene, it is 10 times more susceptible to radiation damage than is polystyrene. There are many other plastics that could be used; there may be some even better than polystyrene or polythene.

There are many hydrogen containing materials other than hydrocarbon plastics that could be used. "Masonite" is a good example, since it has a high hydrogen density, is rigid and cheap. A thin aluminum or magnesium container of water could be used. Heavy water ($D_2O$) would not be as good as ordinary water since the thermal neutron scattering cross-section of deuterium is an order of magnitude less than that of hydrogen. Paraffin or even ice could be used but their physical properties are poor for this application.

Figure 2:
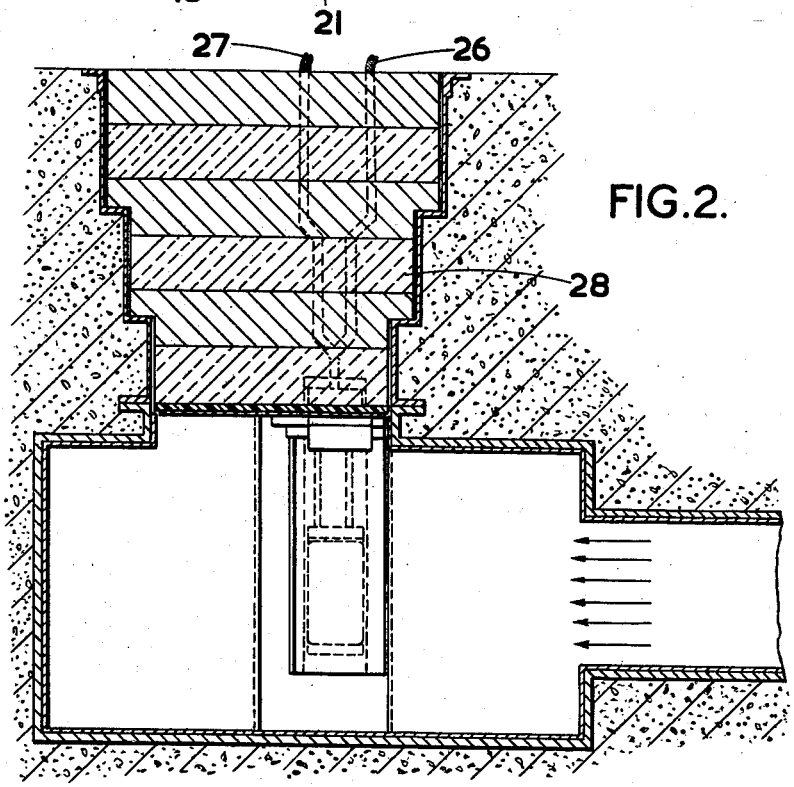

In drawings which illustrate an embodiment in accordance with the invention,

FIGURE 1 is a plan view of a thermal neutron measuring apparatus constructed in accordance with the invention, and FIGURE 2 is an elevation view of the apparatus shown in FIGURE 1.

As shown in FIGURE 1 apparatus for measuring the thermal neutron flux of a nuclear reactor comprises a path for radiations 10 formed in the concrete shielding 11 of the nuclear reactor. This path 10 is lined with a steel lining 12 and a lining 13 of material manufactured under the trade name "Boral". Boral is a thermal neutron absorbing material made by hot rolling a compacted mixture aluminum powder and boron carbide $B_4C$ between two thin sheets of aluminum. It usually comes in large sheets ⅛" to ¼" thick. Its purpose in the installation is to prevent the thermal neutrons which strike the wall from activating the steel lining and the concrete. Gamma rays from the activated walls would give an unwanted background signal on the neutron detectors. Any material which absorbs neutrons strongly and which does not become appreciably radioactive could be used. Cadmium is an example. Situated in the path 10 is a hydrogenous scatterer 14 comprising two sheets of polystyrene 15 and 16, each of which is positioned at an angle of 45° to the path of radiation. Behind the hydrogenous scatterer 14 a beam catcher 17 is provided, the purpose of which is to minimize reflected radiation from the end of the path 10. Thermal neutron detectors 20 and 21 are situated on either side of the path 10 in recesses 18 and 19. These detectors may be of any suitable form although the following characteristics are preferred. The thermal neutron detector used should have a high thermal neutron sensitivity, a low residual activation current after cessation of irradiation by thermal neutrons, and a low gamma ray sensitivity. Any detector with these features is useful. A thermal neutron detector which has been found suitable for use is a TQU ion chamber. This is an argon filled, $B^{10}$ coated ion chamber manufactured by the Canadian General Electric Company and by Atomic Energy of Canada Limited. The TQU ion chamber seems to be the best of the thermal neutron detectors available at present. In front of each detector 20 and 21 a one-quarter inch lead shield 22 and 23 is placed. The ¼" lead shield is used simply as a precautionary measure. It is not essential. The gamma ray field at the ion chambers was calculated by investigating gamma rays from the pile scattering off the beam hole walls and off the plastic scatterer. It was assumed that they only scattered once. The effect of multiple scattering is to further degrade the gamma ray photon energy. The calculation of the effect would be quite tedious and of doubtful accuracy. The ¼" lead shield is provided to reduce the multiple scattered gamma intensity at the neutron detector. This shield will have only a small effect on the thermal neutrons. Each detector 20 and 21 is also provided with a polythene reflector 24 and 25 which serves to enhance the operation of the detector. As previously described, suitable electrical connections 26 and 27 are brought outside the shielding from the thermal neutron detectors for relaying to a remote location the thermal neutron flux measured by the detectors 20 and 21.

As shown in FIGURE 2 a shielding plug 28 consisting of multiple layers of radiation resistant materials and reflecting materials is provided to close in the thermal neutron flux measuring apparatus within the protective shielding of the nuclear reactor. This shielding plug consists of a plurality of alternate layers of steel and Masonite, the inner most layer of Masonite being provided with a Boral lining.

In use of the radiations eminating from the pile of the nuclear reactor consisting of thermal neutrons, fast neutrons, gamma rays and possibly other radiations, travel along the path 10 in the direction shown by the arrows. The thermal neutrons on reaching the hydrogenous scatterer are scattered and detected by the thermal neutron detectors 20 and 21. The remaining higher energy radiations pass through the hydrogenous scatterer and are caught by the beam catcher 17. A thin hydrogenous scatterer filters out of most of the unwanted radiation, so that the ratio of desirable radiation (thermal neutrons) scattered to undesirable radiation scattered is much higher than in any other installation. In the NRU installation, more than 99.9% of all incident radiation is scattered by the lead scatterer. In the present invention thermal neutrons are predominantly scattered. For instance by using a ¼" thick polyethene scatterer placed at 45° to the neutron beam, the percentage per unit solid angle of thermal neutrons scattered at 90° to the beam is about 80%, the percentage of 1 mev. neutrons is about 0.7%, and the percentage of energy of 1 mev. gamma rays scattered at 90° to the beam is about 0.1%.

A thin hydrogenous scatterer weighs much less and therefore costs much less than a lead scatterer with its necessary auxiliary lead shielding. In use the plastic scatterer will weigh between 1 and 2 pounds, whereas the lead installation in NRU weighs more than 400 pounds.

Neutrons scattered by a thin hydrogenous scatter stand very little chance of being absorbed by the scatter—something less than 1% will be absorbed in a ½" thick scatterer. On the other hand, the probability of a neutron being absorbed in lead is high because there is so much more lead required. In the NRU installation at least 60% of the incident thermal neutrons are absorbed in the lead. A considerable reduction in cost and improvement in operation is thus obtained by the use of the present invention.

I claim:
1. Apparatus for measuring the thermal neutron flux of a nuclear reactor comprising means forming a path for radiation from the active lattice of said nuclear reactor to a thermal neutron detector, said path including a thin hydrogenous scattering substance adapted to scatter thermal neutrons to be detected by the detector and said detector being positioned in relation to said scatterer to receive thermal neutrons scattered by said scatterer and substantially no other radiations.

2. In an apparatus for controlling the power generation of a nuclear reactor, a thermal neutron detection apparatus comprising means forming a path for radiations from the active lattice of said nuclear reactor including a thin hydrogenous scatterer and thermal neutron detecting means; said hydrogenous scatterer being positioned in the path of radiations from said nuclear reactor and being adapted to scatter a substantial portion of active thermal neutrons and substantially no other radiations, said thermal neutron detector being positioned to detect thermal neutrons scattered by said hydrogenous scatterer.

3. In an apparatus for detecting thermal neutrons the improvement comprising providing a thermal neutron detector positioned to receive substantially no direct radiation and a hydrogenous scatterer positioned and adapted to scatter thermal neutrons towards the said detector.

References Cited in the file of this patent
UNITED STATES PATENTS

| | | |
|---|---|---|
| 2,556,768 | McKibben | June 12, 1951 |
| 2,681,416 | Thompson | June 15, 1954 |
| 2,728,867 | Wilson | Dec. 27, 1955 |

OTHER REFERENCES

Neutron Resonances in the Kev Region Differential Scattering Cross Sections, by Block et al., from the Physical Review, vol. 109, No. 5, Mar. 1, 1958, pp. 1620–1631.

Measurements of Monoenergetic Neutron Yields With a Simplified Telescope, by Bame et al., from the Review of Scientific Instruments, vol. 29, No. 7, July 1958, pp. 652, 653.